United States Patent [19]
Diner et al.

[11] Patent Number: 5,182,641
[45] Date of Patent: Jan. 26, 1993

[54] COMPOSITE VIDEO AND GRAPHICS DISPLAY FOR CAMERA VIEWING SYSTEMS IN ROBOTICS AND TELEOPERATION

[75] Inventors: Daniel B. Diner, Pasadena, Calif.; Steven C. Venema, Seattle, Wash.

[73] Assignee: The United States of America as represented by the Administrator of the National Aeronautics and Space Administration, Washington, D.C.

[21] Appl. No.: 716,150

[22] Filed: Jun. 17, 1991

[51] Int. Cl.⁵ .......................... H04N 7/18; H04N 7/00
[52] U.S. Cl. .................................. 358/103; 358/108; 358/101; 358/181
[58] Field of Search ................. 358/93, 181, 108, 101, 358/103, 104, 210, 209, 224; 340/825.06, 825.36, 825.49; 901/47; 318/565, 568.25

[56] References Cited

U.S. PATENT DOCUMENTS

| | | | |
|---|---|---|---|
| 4,249,207 | 2/1981 | Harman et al. | 358/108 |
| 4,490,742 | 12/1984 | Wurtzinger | 358/183 |
| 4,507,683 | 3/1985 | Griesshaber et al. | 358/185 |
| 4,942,539 | 7/1990 | McGee et al. | 358/101 |
| 4,992,866 | 2/1991 | Morgan | 358/181 |

Primary Examiner—Victor R. Kostak
Assistant Examiner—Michael H. Lee
Attorney, Agent, or Firm—John H. Kusmiss; Thomas H. Jones; Guy M. Miller

[57] ABSTRACT

A system for real-time video image display for robotics or remote-vehicle teleoperation having at least one robot arm or remotely operated vehicle controlled by an operator through hand-controllers, and one or more television cameras and optional lighting elements. The system has at least one television monitor for display of a television image from a selected one of the cameras and the ability to select one of the cameras for image display. Graphics are generated with icons of the cameras and lighting elements for display surrounding the television image to provide the operator information as to location and orientation of each camera and lighting element, region of illumination of each lighting element, viewed region and range of focus of each camera, an indication of which camera is currently selected for image display for each monitor, and an indication of when controller coordinates for said robot arms or remotely operated vehicles have been transformed to correspond to coordinates of a selected or nonselected camera.

37 Claims, 3 Drawing Sheets

COMPOSITE VIDEO AND GRAPHICS DISPLAY FOR CAMERA VIEWING SYSTEMS IN ROBOTICS AND TELEOPERATION

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates to real-time video image enhancement in the field of robotics and teleoperation and, in particular, to a method and apparatus for providing the operator a graphic display of the locations and orientations of one or more cameras and light sources, and the region each camera views in the workspace, together with information on which camera view is presented on the monitor in the case of a single monitor, or which camera view is presented in each monitor in the case of multiple monitors.

BACKGROUND ART

In teleoperation, visual depth information may be critical. Several possible approaches to providing this depth information are available, including multiple camera television systems, stereo camera television systems, and video graphic systems.

Stereo camera television systems provide depth information by presenting the views of two horizontally separated television cameras, one to each eye. This technique is often called 3-D binocular image presentation. Video graphic systems can provide depth information through a variety of techniques including monocular depth labeling by color, brightness, perspective, occlusion, etc., as well as traditional 3-D binocular image presentation. Multiple camera television systems provide depth information by providing several views of the workspace.

In most systems, camera mobility is desirable. However, moving cameras can confuse the operator. Therefore, it is desirable for the operator to know at all times the location of each camera. The operator may also need to know the location and power of all light sources. Providing such information can be cumbersome and increase operator workload.

Recent advances in video graphics open new possibilities for addressing these and other problems. When using a system with, for example, robot arms or a remotely operated vehicle, hand controllers, movable television cameras and perhaps lighting elements and a voice command recognition system to control the system, both trained and untrained operators may be able to achieve enhanced performance with the aid of video graphics. The present invention concerns a combination of one or more video monitors, one or more television cameras, and video graphics which provide camera and lighting information to the operator in a manner designed to enhance operator performance in teleoperation.

STATEMENT OF THE INVENTION

This invention provides a television system for viewing a workspace using at least one monitor and one or more cameras and perhaps lighting elements. Graphics are generated and displayed on a monitor surrounding the television image in order to provide an operator such information as locations and orientations of all relevant television cameras and lighting elements, and for multiple camera systems, an indication of which camera's image is currently displayed on the one monitor, or in the case of multiple monitors, which camera's image is displayed on each monitor. The operator may use the graphics information to decide how to move cameras and lighting elements for optimum viewing of the workspace. The image displayed may be adjusted in size while displaying more or less graphics, or while sharing the image area with images from the other cameras.

The graphics generated for display surround the television camera image in order that the operator may see all the graphic information and the television camera image on the same monitor. In addition, the graphics information displayed may be designed so that the operator can rely upon his peripheral vision to view the graphic information while concentrating on the television image displayed in the central area of the monitor. The relevant graphics may include graphics of wall grids (indicated by solid line grids) with television camera and lighting element icons displayed on the wall grids to indicate their position around the workspace, their height from the floor space or ground, and their orientation (pan and tilt angle).

The cameras and lighting elements need not necessarily be on real gantry walls. For example, they may be mounted on extension arms movable in the workspace. When camera and/or lighting element positions are not restricted to a plane, graphics of wall grids may be moved to indicate the new position of the plane of the movable camera and/or lighting element. Passive relative motion of lighting elements with respect to the workspace may also be exhibited, for example, the sun while a space-shuttle workspace is being viewed with its cargo bay open.

If the hand-controller coordinates are transformed to correspond with the coordinates of a selected camera, the graphics will indicate that fact so that the operator may orient his movements of the hand controllers with reference to the selected camera whose image is on display. In this text, the term "hand controller" is intended to include any and all controls used for controlling robot arm motions, or driving a remote vehicle, for example, foot pedals, etc.

Additional information may be displayed upon operator demand, which may include, for example, a perspective graphics display of a cone projection of the field of view of a selected camera and its region of focus, as well as the power (brightness) of and the region illuminated by each lighting element. In addition, the boundaries of the view of a nonselected camera may be graphically overlaid on the television image currently displayed, such as by a dotted line circle or ellipse with a dotted line around the nonselected camera. This type of graphics display can also be generated for any lighting element, such as by a dotted line circle or ellipse indicating the area of illumination on the workspace floor by an indicated lighting element.

The camera icon and the cone projection (or the boundaries of the view) of selected camera views will aid the operator in visualizing the views available with the cameras at their current positions, or in moving the unselected cameras prior to selecting them. Similarly the icon and cone projection (or the boundaries of the view) of a lighting beam will aid the operator in selecting the optimum lighting configuration. Within the cone projection of each camera, the region of focus selected can be indicated in the graphics, such as by hatch lines in the unfocused regions, in order to aid the operator in setting the cameras for optimum focus on an object or objects in the workspace.

The graphics generator may also generate a graphics floor grid of the workspace for display on command in place of a television image. Icons of the robot arms or remote vehicles are then displayed in their respective positions on the floor or the ground or in the air, to assist the operator in envisioning the workspace and commanding positions and orientations of the television cameras and lighting elements, such as before viewing through a particular camera or cameras, or before commencing a task, or before commencing each segment of a task. The operator may thus have proper lighting in the workspace and each camera properly positioned and oriented before commencing execution of a task or segment of a task.

Any graphic information provided for display, such as the cameras' cone projections and regions of focus, may be presented intermittently to minimize interference with the television image displayed and avoid confusion due to too much information being displayed at any one time.

It should also be noted that this invention can accommodate high resolution television cameras simply by using a monitor of even higher resolution. Currently, graphics monitors can be obtained with higher resolution than most high resolution television cameras.

Although the gantry surrounding the workspace in the example described below in detail is considered to be comprised of four stationery walls and ceiling, the gantry may in fact be movable as a unit. Also, in special circumstances, the gantry may be a virtual gantry, such as when the cameras and lighting elements are mounted on more than one remote vehicle, each of which carries one or more of the robot arms and/or one or more cameras and/or lighting elements, or when the cameras are mounted in fixed locations, such as on tripods. Consequently, such a virtual gantry is to be considered within the novel features of this invention when the graphics generated for display surround the selected camera image on a monitor.

Novel features that are considered characteristic of invention are set forth with particularity in the appended claims. The invention will best be understood from the following description when read in connection with the accompanying drawings.

DETAILED DESCRIPTION OF THE INVENTION

Figure 1:
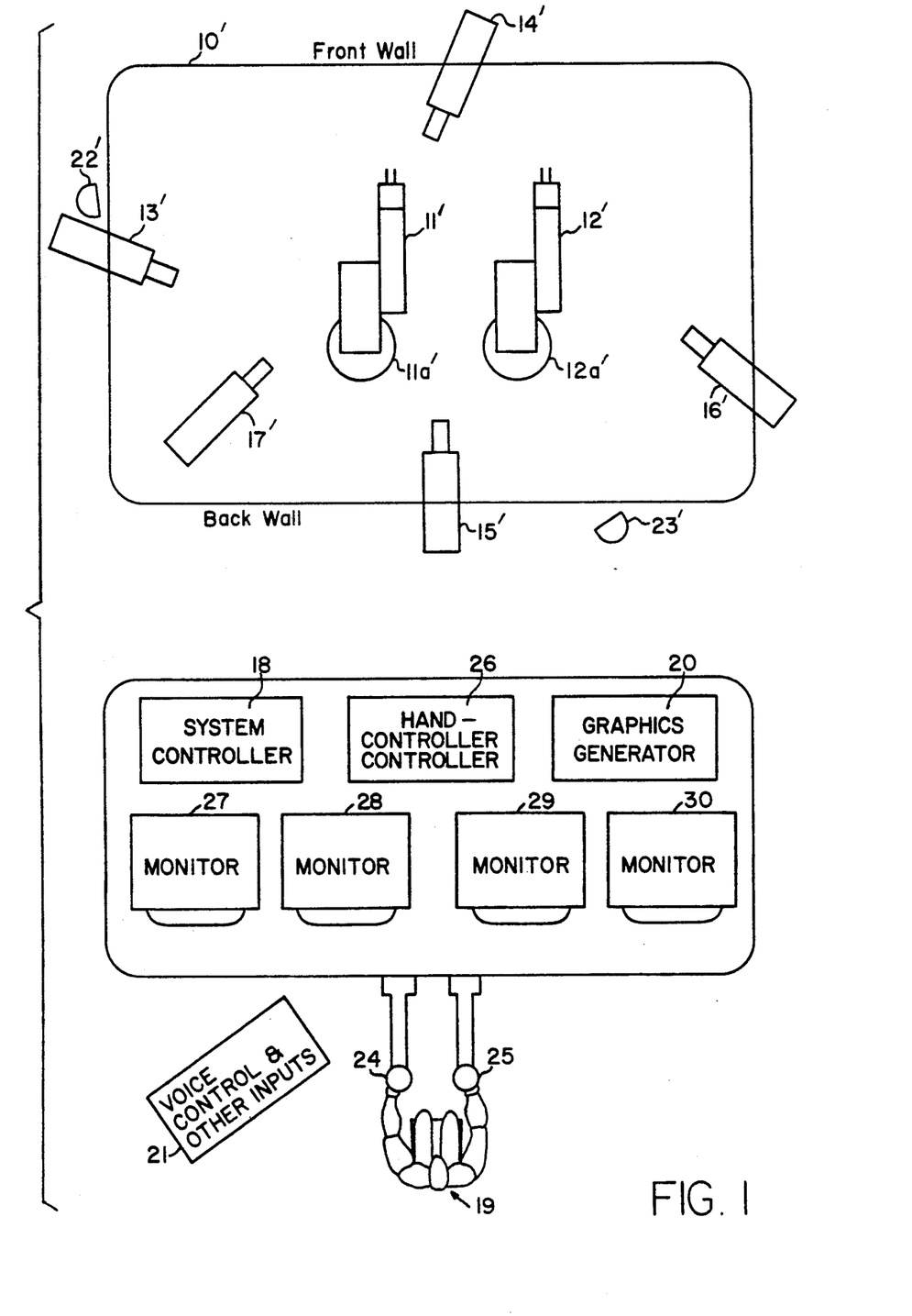
FIG. 1 illustrates schematically a plan view of a gantry supporting four television cameras on four walls, a fifth television camera supported on a ceiling, two lighting elements and two robot arms on the floor of the workspace within the gantry. Also shown is an operator at a control station having a hand controller for each robot arm and multiple television monitors.

FIG. 1 illustrates schematically by way of example and not limitation a plan view of a gantry 10' which surrounds the workspace of two robot arms 11' and 12' attached to mounts 11a' and 12a' which may move in the workspace. Four television cameras 13'–16' are supported on the walls of the gantry, one on each wall movable along the wall horizontally and vertically to any position, and a fifth television camera 17' movable to any position on the ceiling, for example by using servomotors or stepping motors (not shown) to move a beam (also not shown) parallel to either the longer sides or the shorter sides of the gantry and to move the camera on that team along its length. Positioning each of the four cameras on the four walls can be accomplished in the same analogous way.

Figure 2:
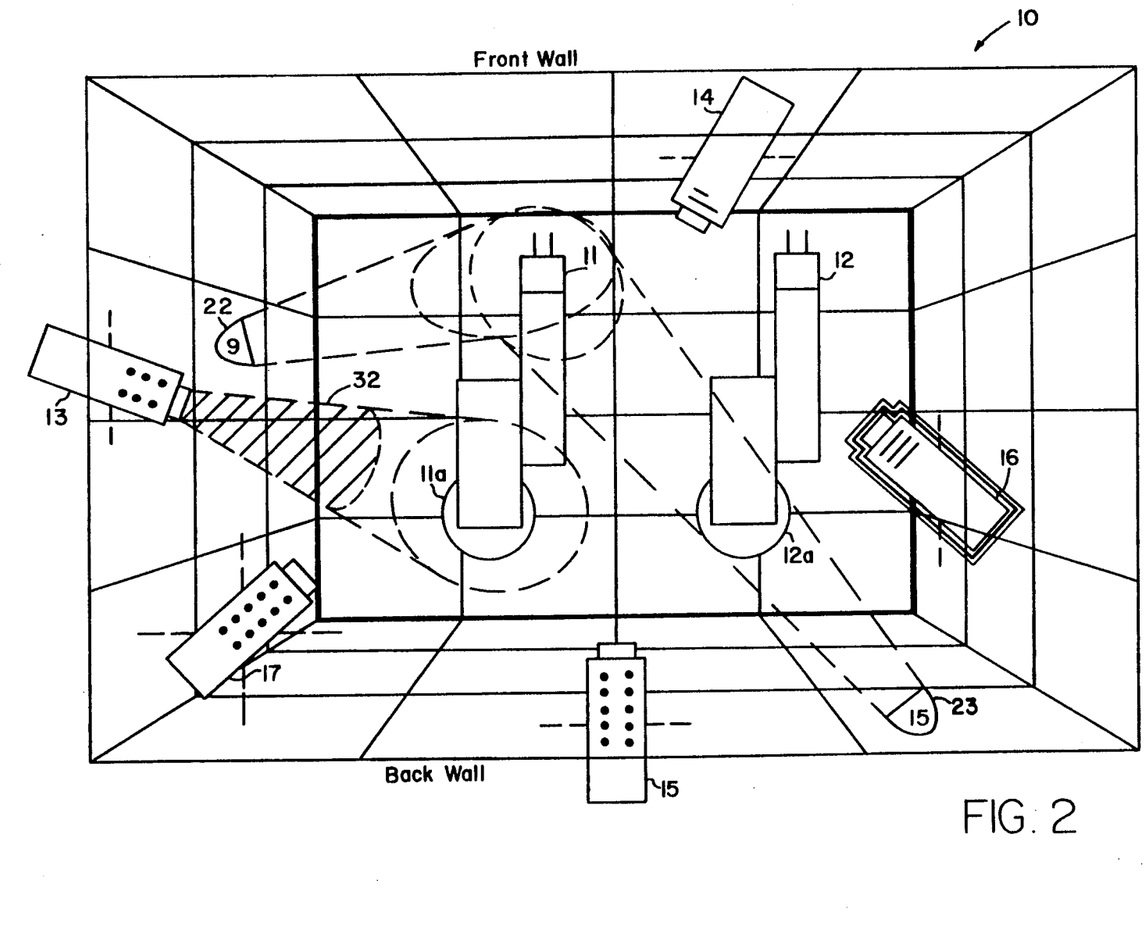
FIG. 2 illustrates an example of a monitor selected from FIG. 1 for display of a perspective graphics wall grid of the gantry shown in FIG. 1, or a virtual wall grid as viewed from above, i.e., looking down into the workspace. The graphics include icons representing the locations of all robots, cameras and lighting elements as well as a cone projection of the field of view of one camera and its region of focus and a cone projection of illumination of two lighting elements pointing into the workspace.
Figure 3:
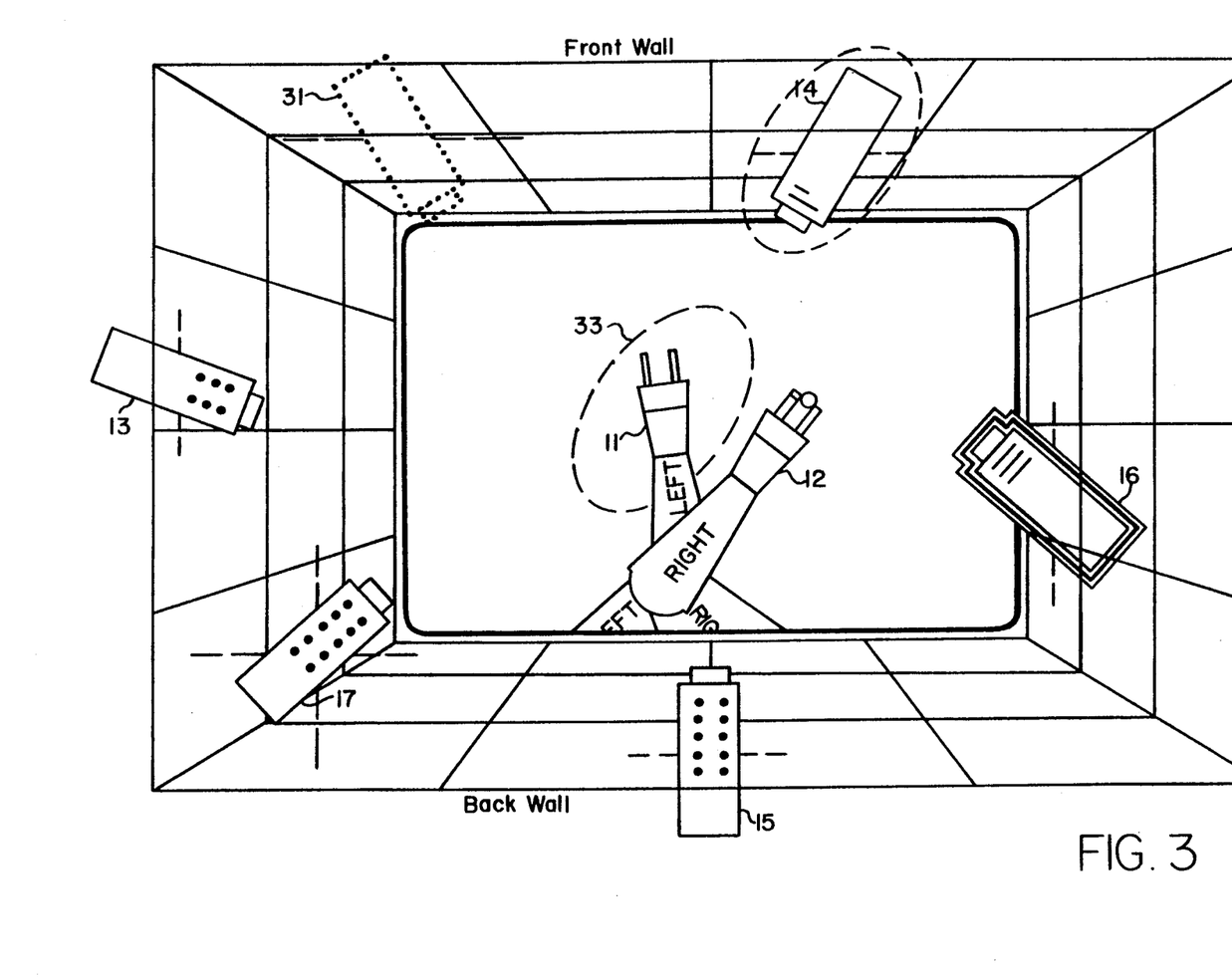
FIG. 3 illustrates an example of a monitor selected from FIG. 1 for display of a television image from a selected camera in FIG. 1 with the perspective graphics wall grid, camera icons and lighting element icons of FIG. 2 displayed around the television image, including a virtual camera icon and boundaries of the view of a nonselected camera graphically overlaid on the television image.

Reference to these cameras 13' through 17' will be made in describing a perspective graphics grid of the walls of the gantry 10' and icons of these cameras as shown in FIGS. 2 and 3. In order to maintain a direct correlation between real cameras 13' through 17' and their icons, the icons will be referred to by the same reference numeral as for the real cameras, but without the prime after the reference numeral. The same convention will be followed in referring to the gantry 10' and its graphics, as well as the two robot arms 11' and 12'.

Each of the five cameras can be provided with servomotors or stepping motors (not shown) that pivot the cameras about vertical and horizontal axes for pan and tilt, and optionally about their viewing axis for roll. In that way, the operator may select the position and orientation of each camera viewing the workspace to select a view from virtually any side and angle, including an overhead view, i.e., a view from the top at any angle, including a vertical (direct topdown) view. Views up from the floor are limited to positioning and orienting a wall camera at the lowest possible position on a wall. However, floor cameras may be added if required.

In FIG. 1, a system controller 18 receives all inputs and commands from a human operator 19, converts them into action and instructs a graphics generator 20 to perform its functions. The operator 19 may control the position and orientation of the cameras through a console 21, for example by voice command, but possibly by other command input means, including such conventional devices as a mouse, foot pedals, and a keyboard. The operator may also use verbal instructions to a second human operator (not shown) who initiates execution of the instructions. In fact, all commands from the principal operator that cannot be entered directly by the principal operator may be entered through the second human operator, including control of lighting elements 22' and 23', camera motions (position, pan, tilt and optionally roll), zoom lens, focus and iris changes, robot motions and video switches, etc., in a conventional manner.

The use of voice commands may be preferred because in normal operation of a task, the operator will have both hands preoccupied in the control of the robot arms 11' and 12' through respective hand controllers 24 and 25 which may operate directly through the system controller 18, but may operate through a separate hand-controller controller 26. All of the elements shown in FIG. 1 are linked by cables and busses (not shown) in a conventional manner.

The coordinates of the hand controllers may be transformed, singularly or in unison, to coincide with the coordinates of a camera the image of which is displayed on a selected one of a plurality of television monitors 27-30. The transformation of hand-controller coordinates to selected television camera coordinates is conventional. What is new and unobvious is the manner in which the selected television camera view is displayed on a monitor screen together with the graphics which surround the television camera view, and the indication that the hand-controller coordinates have been transformed to match the coordinates of that camera.

In some cases there may be only one television monitor, but in usual there will be more than one, and preferably one monitor for each television camera for simultaneous display of television camera images of the workspace from all different available camera points of view. The television image from a camera is displayed in the center of the monitor and can be mapped in a pixel-by-pixel manner so that every pixel of the television image is shown in full clarity on the monitor. But in the example shown in FIG. 1, there are four monitors for five television cameras. Therefore, the operator assigns the monitors to up to four of the five cameras and changes these assignments as the need arises.

Whether there are less than or as many television monitors as cameras, the operator may select the transformation of coordinates for each hand controller 24 and 25 to conform to the coordinates of only one television camera at any one time (except in the special case of two or more cameras parallel to each other). The operator may select the same television camera coordinates for both hand controllers.

When a hand controller's coordinates conform to the coordinates of a television camera, movement of that hand controller in a directly forward direction will move the end of the controlled robot arm 11' or 12' directly away from the selected camera, i.e., along a vector in space determined by the direction of the viewing axis of the selected camera, and thus will be viewed by the operator to move directly into the screen of the corresponding monitor. Also, when controlling a remote vehicle, the vehicle will be observed to move directly into the screen of the corresponding monitor.

If the operator 19 does select the camera for transformation of hand-controller coordinates, the system controller 18 will indicate the selected camera to the hand-controller controller 26 for the required transformations. Transformation is indicated to the operator in the graphics which surround the image displayed on a monitor from the selected camera by, for example, double outlining of the icon of the camera selected, as shown in FIGS. 2 and 3 around the icon 16 for the camera 16'. The inner outline indicates that this is the selected camera whose view is seen on this monitor, and the cuter outline indicates that the hand-controller coordinates have teen transformed to the coordinates of the selected camera.

In practice, both hand controllers often have their coordinates transformed to match the coordinates of one particular television camera selected for viewing, but when the coordinates of each hand-controller are transformed to match the coordinates of a different camera, this can be indicated to the operator in the graphics of the assigned monitor, for example, by framing the image on the corresponding selected monitors with upper case "L"s or "R"s (not shown) for the left and right hand controllers, respectively. Images on a monitor from cameras which are parallel to a selected camera will also be so marked but with, for example, a frame of lower case "l"s or "r"s (not shown) for the left and right hand controllers.

An example of a top-down perspective graphics wall and floor grid is illustrated in FIG. 2 with a cone of view into the workspace of the left television camera 13' displayed with its icon 13. Icons 22 and 23 of lighting elements 22' and 23' (shown in FIG. 1 are generated as part of the graphics with perspective views of their cone of light to enable the operator to select the optimum positions and power for those lighting elements. The power selected for each lighting element is indicated by a number within the lighting element icon or by some other means, such as a color within the icon. This top-down perspective view is chosen for a selected monitor as shown in FIG. 2. The perspective point of view may be chosen by the operator through the system controller to be from any location and any angle (i.e., with its axis in any direction). The graphics generator 20 produces the perspective view.

Icons of the cameras are displayed with or without indication of the cone of view of a selected television camera. When the cone of view is included with a camera icon, the region of focus may also be included in the graphics generated, as by hatch marks in the cone of view in the region of nonfocus. Icons of all television cameras are generated for display continuously or, if desired, intermittently, either simultaneously or in sequence at some regular interval (except perhaps the icon of the camera assigned to the monitor, which may preferably be displayed continuously) to assist the operator, for example, in determining which television camera view to select next for the task at hand. Graphics display of icons of lighting elements may also be generated for display (with or without their cone of light) continuously or intermittently, simultaneously or in sequence, as in the case of graphics for the television cameras, to enable the operator to select the optimum lighting at any given time.

Referring to FIG. 3, which illustrates a screen of a monitor from FIG.1, a television camera image selected from the camera 16' (FIG. 1) is shown in the central portion of the figure. The television camera selected for producing the image displayed is indicated by the inner outline of its icon 16. As will be more fully noted below, the position and angle of the camera may be adjusted by the operator for a better view of the robot arms in performing the task at hand. A top-down view of the graphics wall grid and camera icons are displayed as in FIG. 2, but with an image from a selected television camera presented in the center where the graphics floor grid had been presented in FIG. 2. Thus, the television image is surrounded by the graphics wall grid, and the positions and orientations of all cameras and lighting elements are indicated on that wall grid. The heights of the cameras are indicated by locating the center of each camera icon on the graphic wall grid and showing each camera's height with dashed lines protruding from its sides. Thus, the icon 15 of the back camera 15' is located about 5/6 of the way up the back graphics wall grid, and the icon 16 of the right camera 16' is located 1/6 of the way up the right graphics wall grid. Alternatively, the height of each camera could be indicated by some other means, such as height labeling with an adjacent number.

The pan angle of each camera is obvious from the orientation of the camera in the plane of the display, and the tilt angle is indicated graphically by bars and dots. For example, each bar can mean 15 degrees upward elevation (front of camera above back) and each pair of dots can mean 15 degrees downward elevation. Thus, the ceiling icon 17 in FIG. 3 indicates a tilt of 75 degrees downward by five pairs of dots, while the front camera icon 14 in FIG. 3 indicates an upward tilt of 22½ degrees by one and one-half bars.

If the graphics of camera icons are made large enough and the tars and dots are presented in high enough contrast, the operator can view the television camera image at the center of the monitor and still see all the camera icon locations and orientations with peripheral vision. Thus, the operator need not look directly at the surrounding graphics to read their information. This promises to reduce operator workload by reducing the need for large eye movements to view the graphics.

Bars and dots need not be the best graphic indication of tilt, but for this example, they well illustrate the concept of the invention. An alternate way to graphically indicate the tilt of the cameras would be to perhaps momentarily substitute for the top-down perspective view of the gantry graphics an elevational view from the back side to show the tilt of cameras on the left and right walls or an elevational view from the right (or left) side to show the tilt of the cameras on the front and back walls, or an angular view, or both back and side views at the same time properly labeled to avoid confusion. Other alternatives include presenting the graphics and camera views in 3-D stereo vision.

In FIGS. 2 and 3, the location of the ceiling camera 17' is indicated by two perpendicular dashed lines on its icon 17. If the ceiling camera 17' were repositioned to be more centrally located so that its icon 17 overlays, or partially overlays, the television camera image, its icon could be presented in a transparent fashion, such as by a thin dashed outline of the camera icon.

The television camera image illustrated in FIG. 3 shows the right robot 12' holding a ball and the left robot 11' holding nothing. The advantage of the graphic indication of camera position and orientation is that although both robot grippers seem to appear at equal height, the fact that the right camera icon 16 indicates a tilt upward, in fact, means that the left robot gripper is actually higher than the right robot gripper. Because the right camera icon 16 indicates a tilt of 45 degrees upward, the operator can judge what robot motion will be necessary to hand the ball shown from the right robot gripper to the left robot gripper. This direction is approximately sideways from right to left (because the pan angle of the right camera is about 45 degrees clockwise and the image of the left robot arm appears to the left of the image of the right robot arm) and upward at about a 50 degree angle. If the television image is presented in stereo, the operator can also judge the length of the motion required.

As indicated by the outer outlining of icon 16 in FIG. 3, the coordinates of the right hand controller 25 have been transformed to match the coordinates of the right camera 16'. Thus, to transfer the ball in the gripper of the robot arm 12 in the image shown in FIG. 3, the operator would simply move the hand controller 25 (FIG. 1) to the left, upward about 5 degrees and slightly forward in depth, as seen in the television camera image of FIG. 3.

A virtual camera image can also be displayed, i.e., an image graphically generated to show what a camera at a certain location and orientation (with a certain power lens) would view. The rotations and translations of virtual camera images are also carried out by the graphics generator. One may now transform the hand-controller coordinates so that they match the coordinates of the virtual camera.

Instead of transforming the hand-controller coordinates, it is possible to perform rotations and translations of camera images using image processing to form a virtual camera image whose coordinates match the hand-controller coordinates. In camera configurations where the cameras view the workspace from, for example, four sides, above, and below so that the cameras view everything in the workspace, one can construct a three-dimensional world model of the workspace and from this model perform the aforesaid rotations and translations in the process of constructing an image from the world model without any risk of failing to present obscured objects. For example, in FIG. 1, if an object were located between the robots, one of the cameras (the front camera, the top camera and/or the back camera) would view the object.

If the camera image in FIG. 3 were rotated and/or translated to form a virtual camera image whose coordinates match the hand-controller coordinates (that is, as if Looking at the robots from behind and from the right with the camera pointing straight forward) the rotated and translated television camera image would normally not have in it the obscured object between the robots as the object is not in the selected camera's view. However, the front, top and bottom cameras do view the object, and therefore the object would be included in the three-dimensional world model, and therefore could be included in the virtual camera image, for example, by displaying the robot arm as transparent and showing the object as if seen through the robot arm. An advantage to be gained is that one can construct an "apparent" view from a virtual camera, and display it either graphically or as a simulated actual television image. In that manner, one need not move any of the cameras once they are set up to view all objects in the workspace.

The construction of a virtual camera image for display from a world model is not new. What is new is displaying graphically an icon of the virtual camera at the position and with the orientation of the virtual camera. The icon of the virtual camera may be graphically indicated by a dotted line as shown for icon 31 in FIG. 3. When its image is being selected for display, the dotted line icon 31 is outlined with a dotted outline, and when the hand-controller coordinates are transformed to match the coordinates of that virtual camera, the icon 31 would be outlined with a second dotted outline.

Camera adjustment motions may be by the operator or may be automated to follow the robot arms or vehicles as they move about the workspace, although stationary cameras may also be used. In practice, the invention contemplates that it will be known how each operator prefers the system (the cameras, lighting elements, hand controllers, monitors, etc.) to be configured for each task, so that during the performance of a task the cameras will be controlled by the system controller 18, that is to say the system controller 18 will provide for tailoring the system to the operator. The invention also contemplates that a separate monitor will be assigned to each of the cameras, but that the operator will be able to command through the system controller 18 which camera view will be displayed on which monitor in order to juxtapose views from any two cameras, for example. The initial assignments may be predetermined, left camera on the left-most monitor, right camera on the right-most monitor, etc., but the operator will have the option to change assignments. FIG. 3 illustrates graphics display on only one monitor as an example of the display on every monitor.

In FIG. 3, all the surfaces of each robot arm have been labeled with the words "LEFT" or "RIGHT." Color or any other coding could also be used in the image display to indicate which is the left and which is the right robot arm. When viewing remote vehicles (for example, when measuring radioactivity above a buried nuclear waste site) similar coding of vehicles (and waste-site landmarks) can be used. This helps interpretation of the camera view presented, for example, interpretation of whether the robot arms are reaching forwards or backwards, since either direction of reach is allowed. Also in FIG. 3, the graphics wall grid is presented in a top-down perspective view, i.e., a view looking from directly above. This invention may use other views. In a situation where the back camera view is the most important, operators may prove to perform better when the back camera (not the top camera) does not need depth labeling. Thus, a rear point of view of the graphics wall grid might be desirable instead of the top-down view.

In operation, the operator may wish to know precisely the boundaries of the view of a nonselected camera. This may be presented on command of the operator through the graphics generator with a dotted line ellipse in the graphics surrounding the nonselected camera and with boundaries of the view of a nonselected camera 14 graphically indicated by a dotted line ellipse 33, as shown in FIG. 3. The camera whose view boundary is of interest to the operator is specified by a command to the system controller which directs the graphics generator to operate on data from the specified camera as to its position, orientation (pan and tilt) and zoom power of the lens to generate the graphics necessary to indicate the boundary of view projected on the floor or ground of the workspace. If the view is not satisfactory, the operator may command the camera to be adjusted until the view is satisfactory. The operator may then select that camera for viewing if it is not currently selected or direct his attention to the corresponding monitor if that camera is currently selected. Thus, the operator can avoid inefficient "hunt and look" camera adjustments.

With multiple monitors, graphically showing only one or two camera icons per monitor may give all the information necessary for optimal operator performance. Other refinements of this invention include any multiple camera system, such as where stereo or non-stereo cameras are mounted, each on a dedicated robot arm or other movable platform. In the case of cameras which are not restricted to movement within a plane, for example, cameras mounted on dedicated robots (not shown), the graphics grid of the wall can be moved to show the new plane in which the camera is now located. If it is moved to a position overlaying objects in the image displayed, the graphics wall grid may be made transparent (thin dashed or dotted lines) to avoid obscuring the video image.

Another refinement is to display, in the cone field of view of a camera, the depth of field, i.e., the region of the workspace that will be presented in focus by the cameras. For example, in FIG. 2, a shading of the unfocused region 32 or regions of the cone of view could be graphically presented, thus indicating the region of focus of the camera. Any part of the graphics display may be selected for display continuously or intermittently, either simultaneously or in sequence with some other displays.

Still other refinements that may be made include shrinking or shifting of the video region with or without surrounding graphics on the monitor to allow more detailed and/or larger graphic information to be displayed. For example, the cone field of view of each camera and the cone of light from each lighting element might need more space on the monitor than just the surround, so the system could automatically reduce and shift the television video image with its surround to one side to allow enough room to display the graphics of FIG. 2 (reduced) beside the reduced image of FIG. 3 with its surround.

This invention of graphically indicating on a monitor screen the position, orientation, etc., of cameras and lighting elements relative to a workspace with or without a gantry (real or virtual) is particularly useful in enabling the operator to decide how to adjust the cameras. In fact, any variable part of the system can be so graphically indicated on the monitor screen. As an example of its usefulness, the operator can adjust the non-selected cameras before switching to a new camera view for display on a monitor or, in a multi-monitor control station, before switching attention to another monitor, thus saving valuable time. In a system with only one monitor, moving and focusing a camera and illuminating its view before viewing through it may be particularly desirable.

Although particular embodiments of the invention have been described and illustrated herein, it is recognized that modifications and variations may readily occur to those skilled in the art. Consequently, it is intended that the claims be interpreted to cover such modifications and variations.

We claim:

1. In a system for real-time video image display for robotics teleoperation having at least one robot arm or remotely operated vehicle controlled by an operator through hand controllers and one or more television cameras for viewing a workspace, said system having at least one television monitor for display of a television image from a selected one of said cameras, and optionally having one or more lighting elements, a method which comprises generating graphics for display surrounding said television image, said graphics including icons of any cameras and optionally icons of any lighting elements including in said system and said graphics including an indication of height and orientation of all icon-represented cameras and lighting elements relative to said workspace to provide said operator information as to position and orientation of each icon-represented camera and lighting element, and an indication of which camera is currently selected for image display on said monitor.

2. A method as defined in claim 1 wherein generating said graphics display includes generating for selective display in place of said television image a ground or floor grid of said workspace and an icon for each object included in said workspace to indicate the position of each object in order to assist the operator in performing tasks and in adjusting said cameras included in said system.

3. A method as defined in claim 2 wherein generating said graphics display further includes generating for selective display on command of said operator a graphics perspective for each one or more selected camera icons of a cone of view of said workspace in order to assist said operator in performing tasks and adjusting said television cameras corresponding to said selected camera icons.

4. A method as defined in claim 3 further including generating for selective display on command of said operator a range of focus within said cone of view of one or more selected cameras for which a perspective of a cone of view is generated.

5. A method as defined in claim 2 wherein generating said graphics display further includes generating, for selective display on command of said operator a graphics perspective for selected one or more lighting element icons, a cone of light from each selected one or more lighting element icons illuminating said workspace in order to assist said operator in performing tasks and in adjusting said lighting elements.

6. A method as defined in claim 5 wherein generating said graphics display further includes generating for display the power of each lighting element in connection with generating said icon of each lighting element.

7. A method as defined in claim 2 wherein selected parts of said graphics generated for display are displayed intermittently.

8. A method as defined in claim 1 wherein generating graphics for display surrounding said television image further includes generating for selective display on command of said operator a graphics perspective for each one or more selected camera icons of a cone of view of said workspace in order to assist said operator in performing tasks and in adjusting said television cameras corresponding to said selected camera icons.

9. A method as defined in claim 8 further including generating for selective display on command of said operator a range of focus within said cone of view of one or more selected cameras for which a perspective of a cone of view is generated.

10. A method as defined in claim 1 further including generating for selective display on command of said operator a graphics perspective for each one or more lighting element icons of a cone of light beams from said one or more selected lighting element icons illuminating said workspace in order to assist said operator in performing tasks and in adjusting said lighting elements.

11. A method as defined in claim 10 wherein generating said graphics display further includes generating for display the power of each lighting element in connection with generating said icon of each lighting element.

12. A method as defined in claim 1 wherein selected parts of said graphics generated for display are displayed intermittently.

13. A method as defined in claim 1 wherein generating said graphics display further includes generating graphics indicating when hand-controller coordinates have been transformed to coordinates of said camera selected for image display on said monitor.

14. A method as defined in claim 1 wherein generating a graphics display further includes generating for display perspective wall grids and television camera icons positioned in said wall grids to indicate height from the floor of said workspace and direction of pan together with an indication of the tilt angle of each camera.

15. A method as defined in claim 14 wherein generating a graphics display further includes generating for display an overhead camera icon positioned to indicate the corresponding camera's position overhead and direction of pan together with an indication of tilt angle of said overhead camera.

16. A method as defined in claim 1 wherein generating said graphics display includes an outline of the projected field of view into said workspace of one or more of said cameras not selected for television image display, and an indication of which one or more of said nonselected cameras said projected field of view relates to in order to assist said operator in adjusting said one or more of said nonselected cameras and in determining if said one or more of said nonselected cameras should be selected as the source of a television image for display on a monitor.

17. A method as defined in claim 2 wherein generating said graphics display further includes generating graphics indicating when hand-controller coordinates have been transformed to coordinates of said camera selected for image display on said monitor.

18. In a system for real-time video image display on a monitor for robotics of remote-vehicle teleoperation via a hand controller wherein one or more cameras may be positioned so that everything in said workspace is viewed by at least one camera, in order to construct a three-dimensional model of said objects in said workspace and to display an image of said model on a monitor from a selected viewing direction, a method which comprises generating graphics for display surrounding said image, said graphics including icons of said cameras positioned and oriented to provide said operator information as to locations and orientations of said cameras and an indication of what is the location of the selected viewing direction currently selected for image display on said monitor, performing from this three-dimensional model rotations and translations of said image of the workspace to present an image that would have been collected had a camera existed at a selected viewing location of said workspace with no risk of failing to present objects viewable from any camera, thereby obviating any need to move cameras once they have been initially set to view all locations of the workspace, and displaying graphically on said monitor a virtual camera icon at a position relative to said workspace corresponding to said selected viewing location.

19. A method as defined in claim 18 wherein generating said graphics display further includes generating graphics indicating when hand-controller coordinates have teen transformed to coordinates of said virtual camera selected for image display on said monitor.

20. A method as defined in claim 18 wherein said selected viewing direction of an image rotated for display is selected to be in a back to front direction relative to said workspace so that the coordinates of its image will always match the coordinates of said hand controller.

21. In a system for real-time video image display for robotics or remote-vehicle teleoperation in a workspace for at least one robot arm or remotely operated vehicle controlled by an operator through hand controllers, apparatus comprising one or more television cameras viewing said workspace, at least one television monitor, operator console control means for selecting one camera for display, and graphics generating means for automatically displaying on said monitor relevant graphics surrounding a television image from said selected camera, in order to provide said operator such information as location and orientation of each one of said cameras and an indication of which is the currently viewed camera image on said monitor.

22. Apparatus as defined in claim 21 wherein said relevant graphics displayed is comprised of a perspective wall grid and television camera icons positioned in said wall grid to indicate height from the floor of said workspace and direction of pan together with an indication of the tilt angle of each camera.

23. Apparatus as defined in claim 22 including means for transforming on command of said operator said predetermined hand-controller coordinates relative to the axis of said television camera selected for image display to assist said operator in movement of said hand controller for performance of tasks in said workspace as viewed in said television image displayed on said monitor, and graphics indicating the icon of said television camera selected for display of a television image when said controller coordinates have teen transformed to correspond to coordinates of said television camera selected for television image display.

24. Apparatus as defined in claim 23 wherein said graphics display generating means further generates for selective display, in place of said television image, graphics comprising a ground or floor grid of said workspace and an icon for each object in said workspace, to indicate positions of all objects in said workspace, thereby to assist the operator in performing tasks and in adjusting said cameras.

25. Apparatus as defined in claim 24 wherein said graphics display generating means further generates for selective display on command of said operator graphics of one or more camera icons and a perspective cone of view of said workspace of one or more selected cameras to assist the operator in adjusting said television cameras and in performing tasks.

26. Apparatus as defined in claim 25 wherein a plurality of monitors are provided for a plurality of television cameras with each monitor assigned to display a television image from a selected camera and said graphics generating means includes for display in each monitor relevant graphics surrounding said television image on display with an indicator in each monitor of which is the currently viewed camera image in said monitor.

27. Apparatus as defined in claim 26 including means for transforming on command of said operator said hand-controller coordinates to correspond with a selected one of said plurality of cameras assigned for display on one of said plurality of monitors, and wherein said relevant graphics generated for display includes an indication in each monitor of the television camera icon corresponding to a television camera assigned to said monitor and a further indication of when the hand-controller coordinates have been transformed to correspond with said television camera assigned to said monitor displaying a television image or with another camera.

28. Apparatus as defined in claim 27 wherein said graphics display generating means further generates for selective display lighting element icons and a perspective cone of light from said selected lighting element icons illuminating said workspace in said image area in order to assist said operator in adjusting said lighting elements and in performing tasks.

29. Apparatus as defined in claim 28 wherein said graphics display generating means further includes generating for display the power of each lighting element in connection with generating said icon of each lighting element.

30. Apparatus as defined in claim 29 wherein selected parts of said graphics generated for display are displayed intermittently.

31. Apparatus as defined in claim 25 wherein said graphics generating means further includes generating for selective display on command of said operator a range of focus within said cone of view of one or more selected cameras for which a perspective of a cone of view is generated.

32. A method as defined in claim 1 further including using higher resolution monitors than television cameras, and presenting the composite television and graphics images on the monitors so that the television image part of the composite image will not lose any of the resolution of the television cameras, and the graphics images will surround the television images.

33. A method as defined in claim 18 further including using higher resolution monitors than television cameras, and presenting the composite television and graphics images on the monitors so that the television image part of the composite image will not lose any of the resolution of the television cameras, and the graphics images will surround the television images.

34. Apparatus as defined in claim 21 further including using higher resolution monitors than television cameras, and presenting the composite television and graphics images on the monitors so that the television image part of the composite image will not lose any of the resolution of the television cameras, and the graphics images will surround the television images.

35. A method as defined in claim 1 wherein said graphics generated for display surrounds said television image in close proximity so that said graphics can be accurately perceived by said operator's peripheral vision without shifting the direction of vision from the center of said television monitor to said surrounding graphics, thereby to perceive information conveyed by said graphics.

36. A method as defined in claim 18 wherein said graphics generated for display surrounds said television image in close proximity so that said graphics can be accurately perceived by said operator's peripheral vision without shifting the direction of vision from the center of said television monitor to said surrounding graphics, thereby to perceive information conveyed by said graphics.

37. Apparatus as defined in claim 21 wherein said graphics generated for display surrounds said television image in close proximity so that said graphics can be accurately perceived by said operator's peripheral vision without shifting the direction of vision from the center of said television monitor to said surrounding graphics, thereby to perceive information conveyed by said graphics.

* * * * *